United States Patent [19]

Pavlica et al.

[11] 4,290,814

[45] Sep. 22, 1981

[54] HIGH ALUMINA BRICK

[75] Inventors: Stanley R. Pavlica, Irwin; Donald O. McCreight, Bethel Park, both of Pa.

[73] Assignee: Dresser Industries, Inc., Dallas, Tex.

[21] Appl. No.: 67,582

[22] Filed: Aug. 17, 1979

[51] Int. Cl.³ .................... C04B 35/10; C04B 35/12; C04B 35/48
[52] U.S. Cl. ................................. 501/107; 501/132
[58] Field of Search ............................ 106/57, 65, 66

[56] References Cited

U.S. PATENT DOCUMENTS

| | | | |
|---|---|---|---|
| 2,685,528 | 8/1954 | Robinson | 106/66 |
| 3,192,058 | 6/1965 | Davies et al. | 106/66 |
| 3,227,568 | 1/1966 | Stock et al. | 106/67 |
| 3,948,670 | 4/1976 | Manigault | 106/66 |
| 4,039,344 | 8/1977 | Nishikawa et al. | 106/66 |
| 4,125,406 | 11/1978 | Sowman | 106/66 |

*Primary Examiner*—O. R. Vertiz
*Assistant Examiner*—Mark Bell
*Attorney, Agent, or Firm*—Raymond T. Majesko

[57] ABSTRACT

A ceramically bonded brick made from a batch consisting essentially of fused zirconia-mullite grain or fused zirconia-alumina grain, chromic oxide, and high alumina material.

3 Claims, No Drawings

HIGH ALUMINA BRICK

The present invention relates to high alumina refractories and, more particularly, to improved refractory shapes of the type disclosed and claimed in U.S. Pat. No. 3,192,058. Thus, broadly, the invention relates to the use of an oxide of chromium and a particular type of high alumina material and a fused material in the manufacture of shaped ceramically bonded refractory articles such as brick.

As is well known in the refractories art, there are relatively few inorganic materials which are suitable by reason of high melting point, mineral stability and various other characteristics, to serve as the base material for building refractory or ceramic articles. These materials mostly oxides, may be generally categorized as basic or non-basic on the basis of their mineral forming tendencies at elevated temperatures. Since the present invention is concerned with high alumina refractory materials, it is in the non-basic group.

The progress of the refractory and ceramic arts has been paced to a large extent by the improvement and changes in the metallurgical industries in which the refractory or ceramic articles have particular utility. As various of the operating parameters of these metallurgical processes of contemporary import have become increasingly severe, spalling resistance among other things, has been demanded of the refractory products used in such processes.

Density is another important physical characteristic desired in refractory brick. Obtaining just a few pcf increase can in many instances make the difference between success and failure in a given process environment. Also, the refractory materials dealt with today are substantially the same refractory materials the art has been working with for hundreds of years. Indeed, improvement or advance in the art of refractories, comes about by varying proportions of known ingredients, varying the physical, i.e. crystalline make-up of raw materials, variation of purity, change in sizing, etc.

Various of the foregoing have been utilized in the continued search for increased density. For example, it is known that a fused material is probably the most dense form of a given refractory oxide. Sometimes, a minor amount of additives or crystallizers assist in even greater density. Of course, for many uses, fused shapes are too brittle; that is to say, they lack thermal shock reistance. Thus, it has appeared that a compromise is necessary to obtain the greatest density possible without sacrificing the necessary degree of thermal shock resistance.

Accordingly, it is among the objects of the present invention to form refractory shapes with good density and spalling resistance.

In accordance with the present invention, there is provided ceramic bonded, high alumina, refractory shapes. The shapes are made from a batch consisting essentially of about 3 to 30% of fused zirconia-mullite grain or fused zirconia-alumina grain, about 1 to 15% chromic oxide and the balance of high alumina material.

The chromic oxide used as part of the matrix-forming bonding material, is preferably a very finely divided powder. The separate and discrete particles of this material average about 1 micron or less in diameter, and are remarkably uniform in this size range. It crystallizes in the hexagonal system, similar to the hematite structure. Physical form is indicated by electron microscope, and crystallinity confirmed by the existence of a definite X-ray defraction pattern. Such $Cr_2O_3$ material is water insoluble. Accepted specifications for such are: purity, minimum 97%; water soluble impurities, maximum 0.5%; volatile impurities, maximum 0.5%. Specific gravity is about 5.1 to 5.2.

It is preferred that the alumina material used in the shapes be high purity tabular or refractory grade calcined Bayer process alumina. These materials analyze over 99% $Al_2O_3$. However, less pure high alumina material can be used; for example, calcined South American bauxite. "High alumina materials" has a well understood meaning in the art, for example, as set forth in U.S. Pat. No. 3,067,050. Various high alumina materials, since they are chemically compatible, are frequently blended together to obtain substantially any $Al_2O_3$ content desired. Thus, other high alumina material can be blended and used to practice the invention.

The chemical analyses of the preferred fused zirconia-mullite grain and the preferred fused zirconia-alumina grain for the practice of this invention (by weight and on an oxide basis) are as follows:

|  | Zirconia-Mullite | Zirconia-Alumina |
| --- | --- | --- |
| Silica ($SiO_2$) | 17.3% | 2.0% |
| Alumina ($Al_2O_3$) | 46.8 | 53.6 |
| Titania ($TiO_2$) | 0.14 | 1.8 |
| Iron Oxide ($Fe_2O_3$) | 0.03 | 0.16 |
| Lime (CaO) | 0.08 | 0.24 |
| Magnesia (MgO) | 0.04 | 0.08 |
| Zirconia ($ZrO_2$) | 35.4 | 42.1 |
| Soda ($Na_2O$) | 0.20 | 0.01 |
| Potash ($K_2O$) | 0.01 | 0.01 |

According to the preferred embodiment, the overall sizing of the batch used to make the brick, is substantially as follows:

about 5 to 25% passes a 4 mesh screen and rests on a 10 mesh screen;

about 20 to 30% passes a 10 mesh screen and rests on a 28 mesh screen;

about 10 to 30% passes a 28 mesh screen and rests on a 65 mesh screen; and about 40 to 50% passes the 65 mesh screen. The fused grain is preferably most all in the −4+65 mesh fraction. Of course, there can be some material coarser than 4 mesh and some finer than 65 mesh as will be understood by those skilled in the art of fabricating refractory brick from refractory brick making, size graded, combinations of ingredients.

An actual comparative of testing, brick were made according to U.S. Pat. No. 3,192,058 and compared with brick according to this invention. Similar manufacturing techniques were used to make the comparable brick. The ingredients were mixed together and tempered with about 4% of a 50% solution of dextrin in water and from about 0.3 to 1% water. The mixes were then pressed into shapes at 10,000 psi and burned at 2850° F. with a five-hour hold. The mixes and test results are shown in Table I below.

TABLE I

| MIX DESIGNATION | A | B | C | D | E | F | G |
| --- | --- | --- | --- | --- | --- | --- | --- |
| Tabular Alumina | 90% | 80% | 85% | 82.5% | 60% | 60% | 50% |

TABLE I-continued

| MIX DESIGNATION | A | B | C | D | E | F | G |
|---|---|---|---|---|---|---|---|
| Chromic Oxide | 10 | 10 | 10 | 10 | 10 | 10 | 10 |
| Zirconia-Mullite | | 10 | 5 | 7.5 | | 20 | 30 |
| Zirconia-Alumina | | | | | 20 | | |
| Calcined Alumina | | | | | 10 | | |
| Reactive Alumina | | | | | | 10 | 10 |
| Bulk Density pcf(Av. 6) | 197 | 201 | 201 | 201 | 209 | 206 | 208 |
| Prism Spalling Test - 2200° F. with water quench (Av. 3) cycles to failure: | 4 | 36 | 27 | 40+ | | | |
| Propane-Oxygen Flame Impingement Test | | | | | | | |
| Degree of Spalling | | | | | None | None | None |
| Degree of Cracking | | | | | None | None | None |

The test results show that mix A, made according to the U.S. Pat. No. 3,192,058 lasted only four cycles in the prism spalling test. Mixes B, C and D, according to the invention, cycled from 27 and above. Mixes E, F and G had no cracking or spalling in the propane-oxygen flame impingement test. Mix A had a density of 197 pcf. Mixes according to the present invention had densities in excess of 200 pcf.

In the foregoing discussion, all parts and percentages are by weight, and all screen sizing is by Tyler mesh size determination, unless otherwise specified. All chemical analyses are on the basis of an oxide analysis, in conformity with the practice in the art for reporting the chemical analysis of refractory materials.

It is intended that the foregoing description be construed as illustrative and not in limitation of the invention.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. A ceramically bonded, high alumina, refractory brick produced by the process of pressing and firing a mixture consisting essentially of from about 3 to 30%, by weight, of at least one material selected from the group consisting of fused zirconia-mullite grain and fused zirconia-alumina grain, from about 1 to 15% by weight, of finely divided chromic oxide and the balance a high alumina granular refractory material, said fused grain being substantially all −4+65 mesh particle size, said brick being characterized by having relatively good spalling resistance.

2. The brick of claim 1, in which the fused grain analyses at least 30% zirconia.

3. The brick of claim 1, in which the chromic oxide particles average about one micron or less in diameter.

* * * * *